United States Patent
Yoon et al.

(10) Patent No.: US 7,869,402 B2
(45) Date of Patent: Jan. 11, 2011

(54) METHOD OF EFFICIENTLY UTILIZING RESOURCES IN A WIRELESS COMMUNICATION SYSTEM

(75) Inventors: Young C. Yoon, San Diego, CA (US); Li-Hsiang Sun, San Diego, CA (US); Sang G. Kim, San Diego, CA (US); Shu Wang, San Diego, CA (US); Suk Woo Lee, San Diego, CA (US); Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 755 days.

(21) Appl. No.: 11/767,446

(22) Filed: Jun. 22, 2007

(65) Prior Publication Data

US 2008/0089281 A1  Apr. 17, 2008

Related U.S. Application Data

(60) Provisional application No. 60/805,720, filed on Jun. 23, 2006, provisional application No. 60/805,822, filed on Jun. 26, 2006, provisional application No. 60/820,600, filed on Jul. 27, 2006, provisional application No. 60/820,765, filed on Jul. 28, 2006, provisional application No. 60/821,108, filed on Aug. 1, 2006, provisional application No. 60/820,940, filed on Jul. 31, 2006, provisional application No. 60/821,543, filed on Aug. 4, 2006, provisional application No. 60/885,609, filed on Jan. 18, 2007.

(51) Int. Cl.
    *H04Q 7/00* (2006.01)

(52) U.S. Cl. .................. 370/329; 370/328; 455/403; 455/550.1

(58) Field of Classification Search ................ 370/277, 370/278, 282, 328, 329, 335; 455/403, 450, 455/509, 511, 515
See application file for complete search history.

(56) References Cited

U.S. PATENT DOCUMENTS

| | | | |
|---|---|---|---|
| 7,292,854 B2 * | 11/2007 | Das et al. | 455/434 |
| 7,304,971 B2 * | 12/2007 | Balachandran et al. | 370/335 |
| 7,471,932 B2 * | 12/2008 | Wu et al. | 370/335 |
| 7,653,026 B2 * | 1/2010 | Obuchi et al. | 370/331 |
| 2003/0123470 A1 | 7/2003 | Kim et al. | |
| 2005/0105487 A1 | 5/2005 | Rudolf et al. | |
| 2005/0117553 A1 * | 6/2005 | Wang et al. | 370/338 |
| 2005/0128973 A1 * | 6/2005 | Yagihashi | 370/328 |
| 2005/0143018 A1 * | 6/2005 | Shinozaki | 455/76 |
| 2006/0281414 A1 * | 12/2006 | Lindoff et al. | 455/67.11 |

FOREIGN PATENT DOCUMENTS

EP  1635522  3/2006

* cited by examiner

*Primary Examiner*—CongVan Tran
(74) *Attorney, Agent, or Firm*—Lee, Hong, Degerman, Kang & Waimey

(57) ABSTRACT

A method of transmitting data via a control channel in a wireless communication system is disclosed. More specifically, the method includes transmitting a message including information on which control channel resources are used or unused, and transmitting data via the unused control channel which is allocated to at least one user, wherein the data is an added portion related to at least one sub-packet transmitted on a data channel.

20 Claims, 7 Drawing Sheets

F-PDCCH Format 1

OFDM Resources Allocated to F-PDCCH Format

F-PDCCH Format 2

Uses 4 Times the Amount of Resources

METHOD OF EFFICIENTLY UTILIZING RESOURCES IN A WIRELESS COMMUNICATION SYSTEM

This application claims the benefit of U.S. Provisional Application No. 60/805,720, filed on Jun. 23, 2006, U.S. Provisional Application No. 60/805,822, filed on Jun. 26, 2006, U.S. Provisional Application No. 60/820,600, filed on Jul. 27, 2006, U.S. Provisional Application No. 60/820,765, filed on Jul. 28, 2006, U.S. Provisional Application No. 60/821,108, filed on Aug. 1, 2006, U.S. Provisional Application No. 60/820,940, filed on Jul. 31, 2006, U.S. Provisional Application No. 60/821,543, filed on Aug. 4, 2006, and U.S. Provisional Application No. 60/885,609, filed on Jan. 18, 2007, which are hereby incorporated by reference.

BACKGROUND OF THE INVENTION

1. Field of the Invention

The present invention relates to a method of utilizing resources, and more particularly, to a method of efficiently utilizing resources in a wireless communication system.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

In today's wireless communication system, a user (or a mobile) can freely roam about while enjoying uninterrupted service. To this end, it is important to improve upon current wireless communication technology by way of devising schemes and techniques that improve efficiency as well as effectiveness of service of a communication system under the all sorts of different conditions and environments of the wireless system. To address various conditions and environments and to enhance communication service, various methods, including more efficient utilization of wireless resources, can be implemented to promote more effective and efficient transmission.

SUMMARY OF THE INVENTION

Accordingly, the present invention is directed to a method of efficiently utilized resources in a wireless communication system that substantially obviates one or more problems due to limitations and disadvantages of the related art.

An object of the present invention is to provide a method of transmitting data via a control channel in a wireless communication system.

Another object of the present invention is to provide a method of receiving data via a control channel in a wireless communication system A further object of the present invention is to provide a method of transmitting data via a shared control channel (SCCH) in a wireless communication system.

Yet, another object of the present invention is to provide method of receiving data via a shared control channel (SCCH) in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data via a control channel in a wireless communication system includes transmitting a message including information on which control channel resources are used or unused, and transmitting data via the unused control channel which is allocated to at least one user, wherein the data is an added portion related to at least one sub-packet transmitted on a data channel.

In another aspect of the present invention, a method of receiving data via a control channel in a wireless communication system includes receiving a message including information on which control channel resources are used or unused, and receiving data via the unused control channel which is allocated to at least one user, wherein the data is an added portion related to at least one sub-packet transmitted on a data channel.

In a further aspect of the present invention, a method of transmitting data via a shared control channel (SCCH) in a wireless communication system includes transmitting a packet data control assignment message (PDCAM) including information on which SCCHs are used or unused, and transmitting data via the unused SCCH which is allocated to at least one user, wherein the data is an added portion related to at least one sub-packet transmitted on a data channel.

Yet, in another aspect of the present invention, a method of receiving data via a shared control channel (SCCH) in a wireless communication system includes receiving a packet data control assignment message (PDCAM) including information on which SCCHs are used or unused, and receiving data via the unused SCCH which is specific user, wherein the data is an added portion related to at least one sub-packet transmitted on a data channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
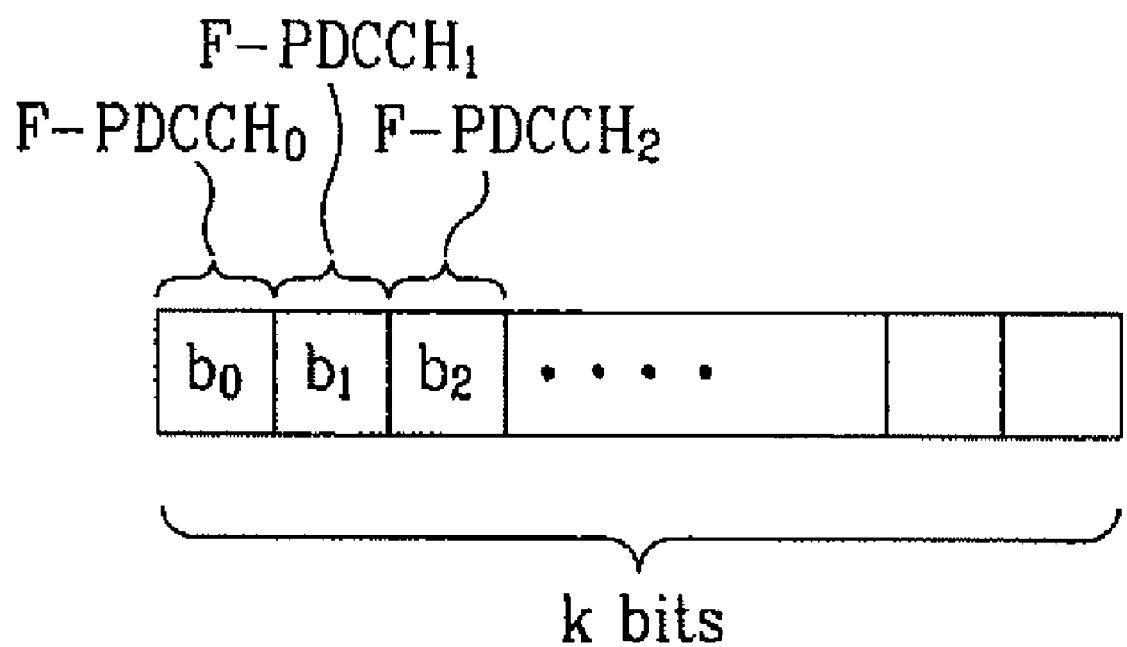
FIG. 1 is an exemplary diagram illustrating a bitmap for the PDCACH.

Reference will now be made in detail to the preferred embodiments of the present invention, examples of which are illustrated in the accompanying drawings. Wherever possible, the same reference numbers will be used throughout the drawings to refer to the same or like parts.

Broadband orthogonal frequency division multiplexing (OFDM) systems typically have a plurality of forward link (FL) packet data channels (F-PDCHs) and reverse link (RL) packet data channels (R-PDCHs) which are shared among access terminals (ATs). Associated with each F-PDCH and R-PDCH is a control channel, commonly referred to as a FL packet data control channel (F-PDCCH), FL Shared Signaling Channel (F-SSCH), or FL shared control channel (F-SCCH). The F-PDCCH, F-SSCH, or F-SCCH is used to assign and manage FL and RL resources and specify respective packet formats. The F-PDCCH, F-SSCH, or SCCH carriers a number of control channel messages that are used to allocate or de-allocate different resources to and from a particular access terminal (AT). Simply put, the F-PDCCH, F-SSCH, or F-SCCH carry all the necessary information (e.g., scheduled AT identity and/or payload size) needed to decode F-PDCH, which can also be referred to as forward data channel (F-DCH).

For simplicity, hereinafter, the control channels (e.g., F-PDCCH, F-SSCH, and F-SCCH) will be uniformly referred to as F-PDCCH. Furthermore, the data channels (e.g., F-DCH and F-PDCH) will be uniformly referred to as F-PDCH.

The FL control segment is present in every FL frame and is allocated in units of base nodes with minimum of three (3) nodes. A base node can also be referred to as a tile (e.g., comprised of 16 subcarriers×8 symbols). A quasi-static allocation of FL control segment is dimensioned for the maximum anticipated F-PDCCH load and is signaled through FL overhead channel (F-SBCCH). In the presence of control load variations, a variable fraction of the control resources can remain unused in each frame. The dynamic sharing approach described in this section allows for a reuse of wasted control resources by the F-DCH or F-PDCH on a frame by frame basis.

The channel nodes allocated to the FL control segment are addressable through the FL traffic resource channel tree and can therefore be assigned to an AT in addition to regular F-DCH (or F-PDCH) nodes. Unlike regular F-PDCH assignments, the use of FL control nodes to carry traffic symbols is conditioned on the presence of one or more unused control resources. Whenever one or more control nodes are assigned to an AT, all modulation symbols associated with these nodes that do not carry any F-PDCCH messages in a given frame may contain data modulation symbols for that AT in the frame.

The F-PDCCH conveys medium access control identification (MAC ID) for which AT the F-PDCH is intended and when and at what rate an AT can transmit an R-PDCH. The MAC ID can be interpreted as the packet format of the F-PDCH to facilitate decoding at the AT.

In operation, the amount of resources needed by an F-PDCCH may vary due to AT geometry. The AT geometry refers to how close or far the AT is from an access network (AN). Here, a good geometry AT can be interpreted as an AT having good or relatively better channel condition. Similarly, a bad geometry AT can be interpreted as an AT having poor or relative worse channel condition. Based on the AT geometry, multiple and/or different F-PDCCH formats can be formed.

In the present document, the AT can also be referred to as a mobile station, mobile terminal, mobile terminal station, or terminal. Moreover, the AN can also be referred to as a base station, network, or Node B.

For broadband wireless systems, the number of F-PDCHs and/or R-PDCHs may be large. Consequently, the number of F-PDCCH's needed to control the F-PDCH and R-PDCH's may be large as well. Given a maximum of a specified number of F-PDCCHs, the number of "active" F-PDCCHs can vary with time.

For example, if there is no new ATs to schedule at a given time, F-PDCCHs are not needed. However, if there are four (4) new ATs to schedule, four (4) F-PDCCHs would be needed. As a result, the resources (in terms of bandwidth, time, and/or power), consumed by the set of F-PDCCHs, can vary with time.

For efficient management of the resources consumed by the F-PDCCH, the resources can be partitioned between the F-PDCHs and the F-PDCCHs. In other words, a control signal can be sent for more efficient resource usage for efficient management of the resources. That is, in order to support use of unused control resources, the status of F-PDCCH or F-PDCCH utilization needs to be conveyed to all ATs that are assigned control nodes, on a frame by frame basis. To this end, a packet data control assignment channel (PDCACH) or a packet data control assignment message (PDCAM) can be used.

The PDCACH or the PDCAM can be used interchangeably. The PDCAM represents a message which can be sent on any physical layer channel, and the PDCACH represents both the message and a dedicated physical layer channel for carrying this message. To put differently, the PDCAM (message) can be sent on a dedicated physical layer channel (i.e., PDCACH) or on some other channel. For simplicity, the term PDCACH will be used hereinafter.

This PDCACH signal can be used to indicate the partitioning of resources between F-PDCCH(s) and F-PDCH(s). That is, the PDCACH (or F-PDCACH) allows for dynamic re-partitioning of resources between control signaling (e.g., F-PDCCHs) and data transmissions (F-PDCHs) at the same frame rate.

The PDCACH is a broadband/multicast channel which is sent each frame. The PDCACH can indicate, using a bitmap approach, information such as the number of F-PDCCHs used in a frame and/or which F-PDCCH is active or inactive. With that, a scheduled AT can be assigned these so-called potential resources and can use them if one or more F-PDCCH becomes inactive.

Simply put, the PDCACH indicates partitioning of resources between the F-PDCCH and the F-PDCH. For example, if all the F-PDCCHs are inactive, then those resources reserved for the F-PDCCHs can then be used by the F-PDCHs. Conversely, if all the F-PDCCHs are active, then those reserved resources cannot be used by the F-PDCHs.

The PDCACH can carry F-PDCCH resources in a bitmap format in the FL segment of every frame and can be determined by the maximum number of potentially unused F-PDCCH messages according to the quasi-static allocation of FL control segment while every bit of the bitmap indicates utilization status of the associated F-PDCCH message.

Thus, an AT that is assigned FL control nodes (or tiles) and receives PDCACH can determine which modulation symbols associated to FL control nodes within its assignment are not used by the F-PDCCH and therefore carry data symbols.

Here, the PDCACH can be characterized as a special case of F-PDCCH message. The PDCACH can carry a bitmap with a variable length, which corresponds to a maximum number of F-PDCCH segments that can potentially be unused. Moreover, the F-PDCCH segments are sized to carry up to 20 information bits.

The PDCACH can be sent in the resource reserved for the F-PDCCH, using a format which is same or different from the format of the F-PDCCH. If the PDCACH is sent in a different format and the number of modulation symbols for the F-PDCCH is less than the number of modulation symbols of the F-PDCCH, the remaining F-PDCCH symbols can be used for data transmission (e.g., sending parity bits for data user(s), assigned to PDDCH resource as part of the data channel).

If the PDCACH is sent in the same format as that of the F-PDCCH (i.e., special F-PDCCH), the information bits carried by the F-PDCCH may be longer than the information bits in the PDCACH. In this case, the extra information bits, not used by the PDCACH and cyclic redundancy check (CRC), can be used for data transmission (e.g., sending parity bits for data user(s), assigned the F-PDCCH resource as part of the data channel).

In addition, the PDCACH can use a set of resources reserved for the PDCACH. It can be sent as a separate channel or using the same transmission format as the F-PDCCH (but defined as a PDCACH logically) as described above. The resource for the PDCACH may also be signaled in the preamble. The AT and AN has a configurable attribute to indicate whether this PDCACH feature is supported. For example, an attribute is needed to allow the AT to indicate to the AN whether or not it supports the PDCACH feature.

Further, the concept of the PDCACH can be generalized if the number of F-PDCCH types is greater than one (1). For example, one F-PDCCH (Type 1) can use a higher-order modulation coding scheme (MCS) whereas another F-PDCCH (Type 2) can use a lower-order MCS. As another example, F-PDCCH Type 1 can instead carry scheduling information for good geometry ATs and F-PDCCH Type 2 can carry scheduling information for bad geometry ATs. In this example, an AT can determine its geometry type by some filtering operation of its reported channel quality information (CQI) or data rate control (DRC) values transmitted during some moving window of time.

If there are two F-PDCCH types, then two separate PDCACHs can be defined and used where one PDCACH can signal which F-PDCCHs of Type 1 are used and another PDCACH can signal which F-PDCCHs of Type 2 are used.

With this, the AT capable of decoding Type 1 may then avoid decoding Type 2 F-PDCCHs and vice versa. Further, the ATs capable of decoding both Types can then decode both types.

With respect to transmission of F-PDCCHs, there are two (2) configurations, namely, default configuration and higher MCS configuration. For the default configuration, quadrature phase shift keying (QPSK) can be used. For higher MCS configuration, modulation order, QPSK or 16 quadrature amplitude modulation (QAM) can be used.

As discussed, the F-PDCCHs can be active or inactive. However, in a general case, zero, one, or all the F-PDCCHs may be active resulting in different levels of reserved resources available to the F-PDCH. As such, there are various ways of realizing this flexible and efficient re-allocation of resources which will be explained.

Furthermore, if the last F-PDCCH (e.g., F-PDCCH_(N−1)) is omitted as well so that when all F-PDCCHs are active, the PDCACH need not be sent. Here, all F-PDCCHs can be active when the last F-PDCCH is sent, assuming a sequencing (i.e., prioritizing of the F-PDCCHs in order of usage). The absence of the PDCACH is equivalent to requiring that the AT read all F-PDCCHs and indicating that there are no extra resources available.

Further, restricted (or reserved) F-PDCCH resources can be assigned only to good-geometry ATs. That is, bad-geometry ATs cannot use the reserved resources.

With respect to a bitmap approach, a bitmap can be of variable length. For example, the bitmap can be of length 2 to 32 bits. Furthermore, irrespective of the length, the bitmap can be sent over the same resources, (e.g., orthogonal frequency division multiplexing (OFDM) tone resources). What changes is the bandwidth expansion factor, also known as coding rate. As the bitmap length increases, the coding rate increases.

The coding rate can be adjusted through coded bit repetition and/or puncturing. For example, the bitmap of variable length can be inputted into a convolution encoder of rate n/k and constraint length L (and, possibly an interleaver). If the total number of coded bits that can be carried is M, for example, then the convolutional encoder output bits are repeated and/or punctured to create a set of encoded bits of length M.

The length of the bitmap can be indicated by upper layer signaling or medium access control (MAC) layer signaling. For example, the length of the bitmap can be transmitted on the broadcast channel of the super-frame preamble.

The length of the bitmap can also be indicated by the number of F-PDCCHs, which in turn, can be indicated by upper layer or MAC layer signaling. Here, the indication by the number of F-PDCCHs can also be referred to as link assignment blocks (LABs) or as link assignment message (LAM). Similarly, the number of F-PDCCHs can be indicated on the broadcast channel of the super-frame preamble.

Further, the length of the PDCACH bitmap can be less than or equal to the number of F-PDCCHs. Here, certain F-PDCCHs need not be included in the bitmap. For example, the first F-PDCCH (e.g., F-PDCCH_0) or more is omitted if there activity factor is high. In other words, the first F-PDCCH or more can be omitted if they are likely to be active (or used).

Another option may be to partition a single PDCACH bitmap into L sub-first bitmaps. The first sub-bitmap can be used to signal which F-PDCCHs of Type 1 are used. The second sub-bitmap can be used to signal which F-PDCCHs of Type 2 are used, and so on to the $L^{th}$ sub-bitmap which can be used to signal which F-PDCCHs of Type L are used.

For example, if there are 21 bitmap positions and L=2, the first 12 positions can be reserved for F-PDCCH Type 1 and the remaining 9 bit positions can be reserved for F-PDCCH. Here, the PDCACH or other upper layer message has field(s) indicating the size of each sub-bitmap.

To support bitmaps for multiple F-PDCCH Types, and/or in turn, multiple bitmaps or multiple sub-bitmaps, signaling is required to allow an AT to determine which bitmap or sub-bitmap carries which F-PDCCH Type. For example, two or more bitmaps can be defined and indicated by upper layer messaging. As another example, one or more bitmaps can be defined with two or more sub-maps defined and indicated by upper layer messaging.

Another option would be to use MAC layer signaling wherein one or more bits are either appended to the bitmap or taken from the bitmap (which can reduce the number of bits in the original bitmap).

For example, referring to one of the above example's 21 bitmap positions (e.g. the first bit position) and reserve it for MAC layer signaling. This would leave 20 bitmap positions. If this bit value is 0, then the bitmap makes no distinction of the F-PDCCH Type. If this bit value is 1, then the bitmap does make a distinction of the F-PDCCH Type (e.g., first 12 positions for F-PDCCH Type 1 and the remaining 9 bit positions for F-PDCCH Type 2). This idea can be generalized to K bits to allow for the defining of up to $2^K$ sub-bitmaps.

With respect to format(s) of the PDCACH, a bitmap and a CRC only can be sent. Here, the PDCACH can have length K bitmap plus a CRC (e.g., K+16-bit CRC). For example, the PDCACH can be 24 bits (bitmap of 8 bits+CRC of 16 bits). Alternatively, F-PDCCH_0 plus bitmap (piggy-backed) (e.g., 7+45=52 bits or 7+35=42 bits).

With regards to transmission formats, only a bitmap can be transmitted. Alternatively, both the bitmap and the F-PDCCH can be transmitted. When one of the either formats is used for transmission, the AT can perform decoding sequentially (e.g., the AT looks for F-PDCCH_0+bitmap first). If decoding fails, the AT can then look for the bitmap+CRC only transmission.

In a general case, multiple bits for the flag in the preamble can be used. Here, each flag value can be mapped to a particular PDCACH format. The different PDCACH formats can support different bitmap lengths, for example.

With respect to transmission of the bitmap, the PDCACH bitmap can be sent at a power level sufficient to reach those ATs allowed to use the extra (or unused) SCCH resources. That is, the transmission of the PDCACH entails a loss of transmission power but a gain in bandwidth. Here, the gain can be achieved in bandwidth limited region of operations rather than in power limited regions of operations. This can imply that bad geometry ATs will likely fail in decoding the PDCACH and need to skip to the next sub-packet starting point.

Further, the bitmap for the PDCACH and the bitmap for scheduling voice users can be combined. That is, with the increase in the number of voice users, the number of F-PDCCHs needed can be reduced. Since the PDCACH is broadcasted to each slot, both bitmaps (e.g., the bitmap for the PDCACH and the bitmap for scheduling voice users) can be sent together.

FIG. 1 is an exemplary diagram illustrating a bitmap for the PDCACH (or F-PDCCH). Consider a case where a specified number (e.g., K) of F-PDCCHs are needed. Referring to FIG. 1, a bitmap of length K is defined. More specifically, each bitmap position is mapped to an F-PDCCH. To put differently, the bitmap position k maps to F-PDCCH_k where k=0, 1, . . . , K−1. Here, there are no overlapping of tone resources.

If the bitmap position k is "1" (i.e., $b_k$=1), for example, then the corresponding F-PDCCH_k is "ON." Here, "ON" means that the F-PDCCH is used. However, if the bitmap position k is "0" (i.e., $b_k$=0), then the corresponding F-PDCCH_k is "OFF." Here, "OFF" means that the F-PDCCH is not used. To put differently, if there are K distinct F-PDCCHs defined (e.g., PCCCH_k or F-SSCH_k), the kth bitmap position indicates whether or not F-PDCCH_k is transmitted or not transmitted.

Further, the bitmap can be designed as a broadcast-type channel to reach all the ATs in the AN (or cell/sector) coverage area. If an AT successfully decodes the bitmap, then the AT needs only decode those F-PDCCHs which are "ON" as indicated by the bitmap. However, if an AT is unable to decode the PDCACH, then the AT must decode all the F-PDCCHs. Further, if the bitmap indicates that the F-PDCCH is "OFF," then there are unused time-frequency resources, and these unused (or leftover or extra) resources can be used for the F-PDCHs to transmit data. Lastly, the PDCACH can be sent with a power level sufficient to reach those ATs which are assigned restricted nodes.

Instead, the bitmap can be transmitted as a multicast-type channel to reach a sub-set of ATs in the sector. For example, a transmit power of the bitmap can be such that it reaches only good-geometry ATs. Here, only the ATs with good-geometry would be allowed to use the extra resources from un-used F-PDCCH resources. Hence, the ATs with bad-geometry would not be able to use the extra resources. The advantage of this approach is to reduce the power consumed by the bitmap.

The bitmap can be sent in different ways. For example, the bitmap can be sent on a separate physical channel (e.g., F-PDCACH) which can be referred to as a bitmap-only version. Alternatively, the bitmap can be piggy-backed on one of the F-PDCCH resources (e.g., a special F-PDCCH) which can be referred to as a piggy-backed version. Here, the special F-PDCCH can be F-PDCCH_0 which needs to be sent at high power to reach all ATs. Further, the F-PDCH_0 can be used to schedule bad-geometry ATs, preferably.

Another way to send the bitmap is to allow the transmitting end to transmit in either of the two (2) versions. For example, the transmission can be in the piggy-backed version if there is at least one new AT that is scheduled (i.e., an AT requiring an F-PDCCH). However, if there is no new AT being scheduled, then the bitmap-only signal can be sent, meaning no piggy-backing, since there is no need for the F-PDCCH.

From the AT's perspective, the AT can be designed to read one of the two (2) possibilities first. Continuing from the above example, the AT can decode the piggy-backed version first. If there is a decoding failure, the AT can then read from the bitmap-only version.

Further, each AT can decode the F-PDCCHs in a certain sequence to minimize read times. For example, bad-geometry ATs can start reading F-PDCCHs with low spectral efficiency (bad geometry) and then work its way to F-PDCCHs with higher spectral-efficiencies. On the other hand, good-geometry ATs can start reading F-PDCCHs with high spectral efficiencies.

In addition, the system can be more selectively designed for greater effectiveness and/or efficiency. For example, the system can be designed in a way that bad-geometry ATs can be read only certain formats.

Alternatively, the bitmap F-PDCACH can be configured as an optional channel. If the channel is de-activated, the network can define a permanent set of F-PDCCHs that each AT can decode. This can be indicated at call setup via upper layer messaging or in the broadcast in the preamble, which can be sent in each frame, with a flag, for example. In practice, such a configuration of the bitmap F-PDCACH can be useful where there are not many ATs in the network.

In addition, the F-PDCACH can also be applied to manage the assignment type F-PDCCHs. For example, the PDCACH can be used to manage F-PDCCHs which may or may not be orthogonal or which may or may not be OFDM (e.g., CDMA, GSM).

Figure 2:
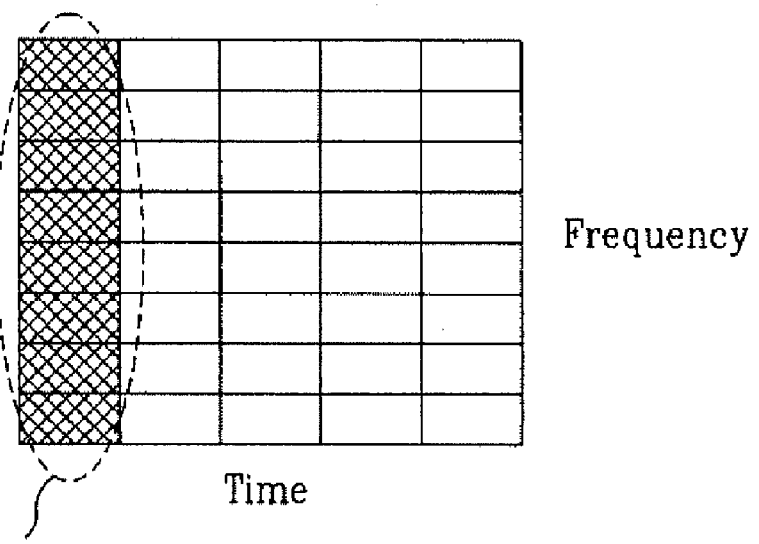
FIG. 2 is an exemplary diagram illustrating a format of the F-PDCCH with respect to time-frequency resources.
Figure 2:
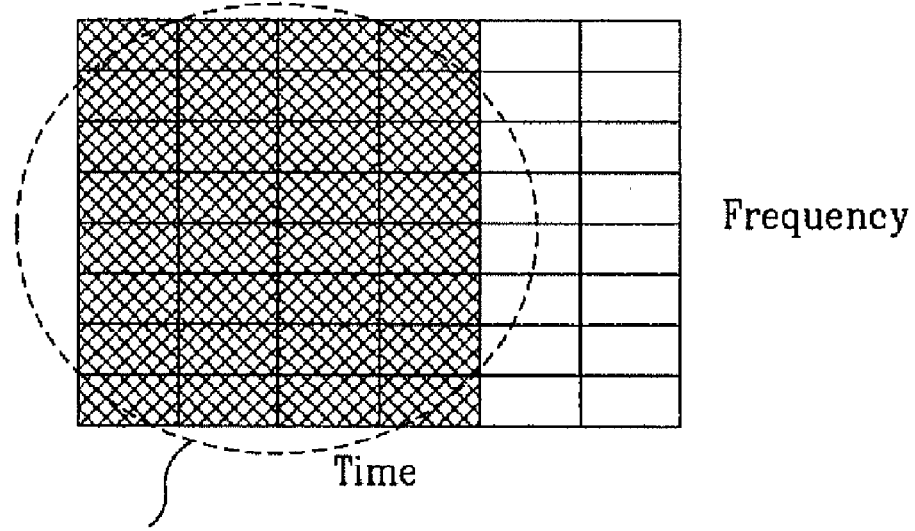

FIG. 2 is an exemplary diagram illustrating a format of the F-PDCCH with respect to time-frequency resources. Referring to FIG. 2, the resources are allocated to all the tones (or frequency or sub-carriers) at a given time. That is, the OFDM resources can be allocated according to the F-PDCCH format. Similarly, according to the F-PDCCH format, more OFDM resources can be allocated (e.g., four (4) times the amount of resources), as shown in FIG. 2.

The F-PDCCH can take one of many different formats. For example, the format can be designed so that more tones (or sub-carriers) can be used to support the ATs having bad geometry. Alternatively, the format can be designed to provide less tones (or sub-carriers) to support the ATs having good geometry.

In the event an AT fails to decode the F-PDCACH, then the AT does not know which resources were partitioned for the F-PDCH. It is important to configure the format so that even if the AT fails to decode the PDCACH, the AT is still able to receive data using the original set of resources, without the aid of the extra resources (e.g., the unused F-PDCCH resources).

To combat such an event, the AT can know the minimum as well as the maximum number of tones or resources partitioned for the F-PDCH. Here, the minimum can refer to when all F-PDCCHs are used, and the maximum can refer to when no F-PDCCH is used. Generally, the AT can assume the worst-case scenario which is that the minimum number of tones is used by the F-PDCH.

However, if the AN actually uses more than the minimum number of tones when some F-PDCCHs were inactive, the start position of the coded bits in the next or subsequent transmission (e.g., in a hybrid automatic request (H-ARQ) re-transmission) may be ambiguous. Therefore, the start position of each sub-packet can be pre-determined from the start. Alternatively, the value of the start position of each sub-packet can be set under the assumption that the maximum number of resources can be allocated to the F-PDCH.

Figure 3:
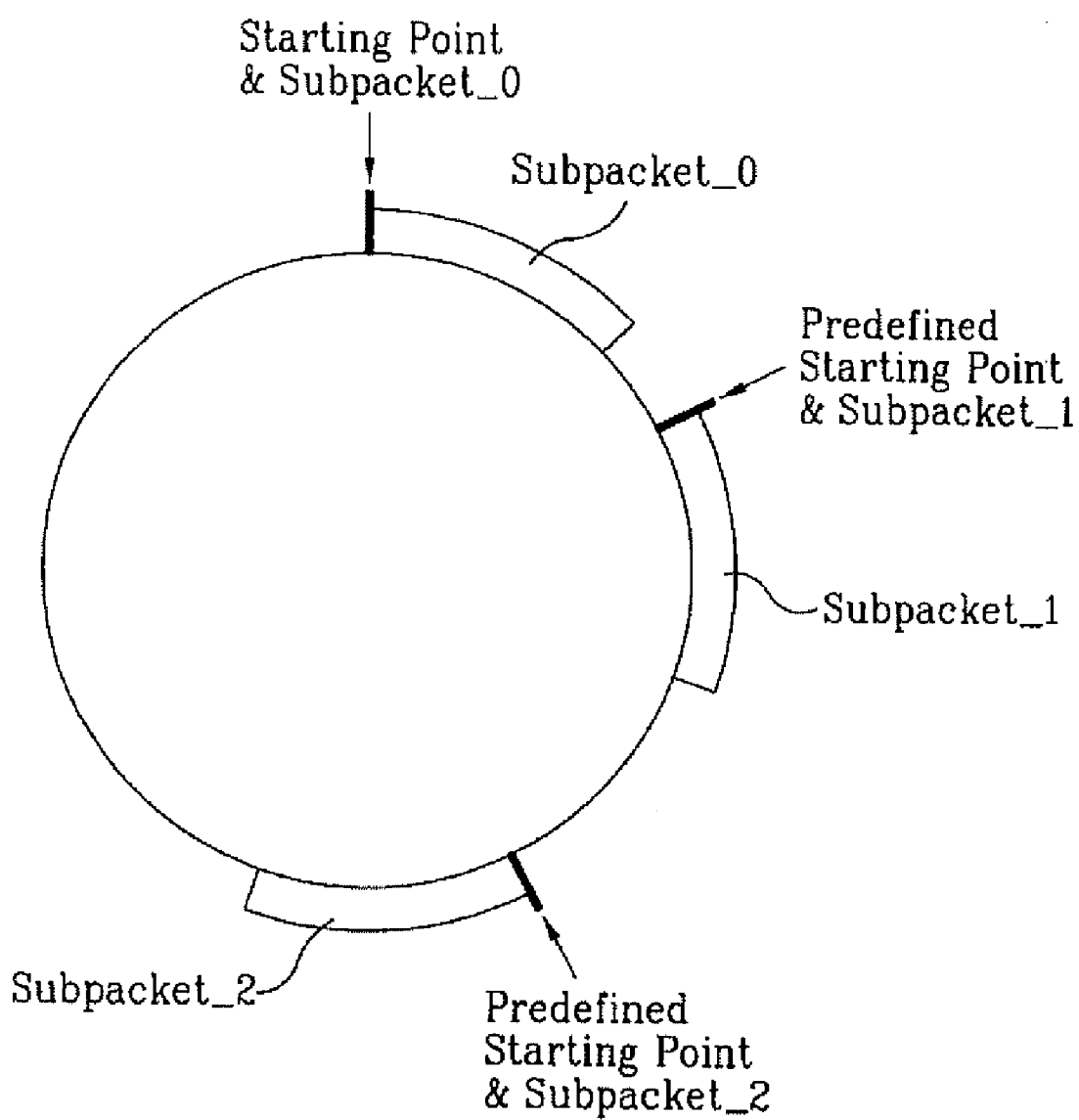
FIG. 3 is an exemplary diagram illustrating pre-defined starting points of sub-packets.

In addition, the starting positions of sub-packets can be pre-set or predefined. FIG. 3 is an exemplary diagram illustrating pre-defined starting points of sub-packets. Referring to FIG. 3, sub-packet-k can have variable lengths depending on the number of leftover (or un-used) F-PDCCH resources due to 'OFF' F-PDCCHs. However, the starting positions of the sub-packets can be pre-defined. Furthermore, FIG. 3 can also be interpreted as an application example of a turbo encoder output bits for H-ARQ.

In general, as discussed above, the starting point(s) of each sub-packet needs to be known priori by both the AT and the AN, if the transmission format is indicated by the F-PDCCH when the AT is scheduled. Moreover, the positions (or identity) of the extra encoder bits may be known by both the AT and the AN when the extra PCDDH resources are available.

To this end, systematic bits for the extra (or un-used) resources can be used. More specifically, the start position(s) can be in the start position of sub-packet_0 as illustrated in FIG. 3. Here, the number of systematic bits selected can be equal to the number of bits that can be supported by the extra (or un-used) bits. In addition, the systematic bits can be selected as consecutive bits or non-contiguous bits (e.g., every other bit).

Further, instead of using the systematic bits, parity bits can be used. That is, the parity bits can be used to perform the processes as discussed with respect to the systematic bits. Alternatively, a combination of the systematic bits and the parity bits can be used. In so doing, it is important that the exact positions (or identities) of the coded bits (or information bits) are known by both the AT and the AN, as discussed previously.

The F-PDCCH formats of above are discussed based on orthogonality which means that there are no overlapped tones. In contrast, the F-PDCCH formats can be overlapped (e.g. sharing tones). Here, the final selection of the F-PDCCHs must be such that the selected set have no overlapped tones.

For example, if there are three (3) bad geometry F-PDCCHs (e.g., F-PDCCH_0 to F-PDCCH_2) and four (4) good geometry F-PDCCHs (e.g., F-PDCCH_3 to F-PDCCH_6). Here, F-PDCCH_2 and F-PDCCH_6 can have overlapped tones which means that if F-PDCCH_2 is selected, then F-PDCCH_6 cannot be selected.

With overlapped or sharing tones, tone resources can be saved. Alternatively, the F-PDCCHs can be allocated permanently, in addition to and outside of those defined in the bitmap. For example, if the size of the bitmap is 8 and defines F-PDCCH_2 to F-PDCCH_9, another two (2) permanently "ON" F-PDCCHs can be F-PDCCH_0 and F-PDCCH_1.

The mapping of the bitmap position to an F-PDCCH format can be adaptively changed by a broadcast message. For example, the mapping can be changed when broadcast preamble is transmitted.

As discussed, there can be extra or unused resources. Generally, unused F-PDCCH resources can be used as F-PDCH resources. That is, the partitioning of the resources between the F-PDCCH and F-PDCH can change using the PDCACH.

Absent specification of the F-PDCCH design, the resources allocated to F-PDCCHs (e.g., F-PDCCH_k) can be used for either the F-PDCCH_k or for data for the AT. Moreover, multiple F-PDCCH resources can be allocated to a single AT. Alternatively, a single F-PDCCH resource can be allocated to multiple ATs. Alternatively, one or more F-PDCCH resources can be allocated to multiple ATs.

In operation, an AT that is assigned some FL control nodes and does not detect F-PDCCH utilization bitmap in a given frame can still demodulate the portion of the data symbols sent on the regular F-PDCH resources. To this end, data modulation can be carried out in such a way that the set of modulation symbols sent over the regular portion of AT's assignment cannot depend on the availability of FL control resources.

Figure 4:
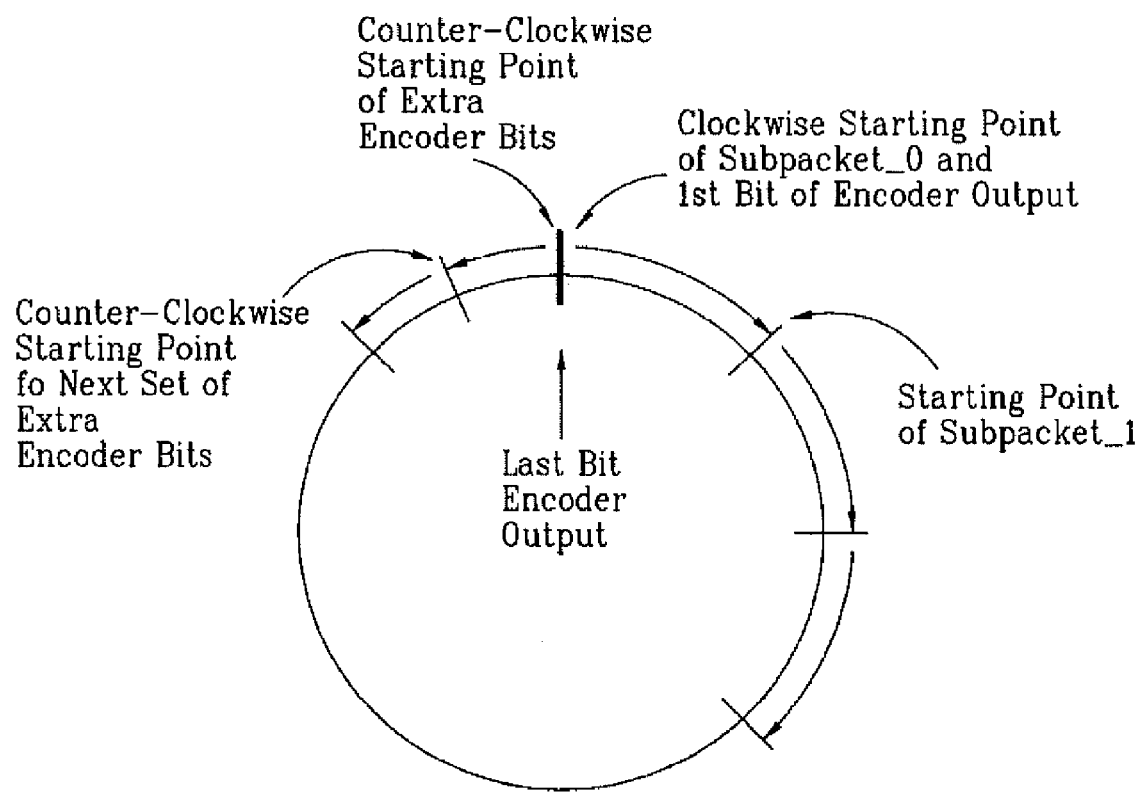
FIG. 4 is an exemplary diagram illustrating F-PDCH encoder rule for unused bits.

A modulation strategy that achieves this goal is illustrated in FIG. 4. FIG. 4 is an exemplary diagram illustrating F-PDCH encoder rule for unused bits. A circular buffer is filled out clockwise with the entire sequence of coded bits coming out of a channel interleaver. Modulation of the regular F-DCH resources across H-ARQ transmissions can be accomplished by reading out portions of coded bits from the circular buffer clockwise and mapping these bits to the regular F-PDCH resources according to the packet and pilot format of the AT's F-PDCH assignment.

On the other hand, modulation of the supplementary F-PDCH resources (i.e., portions of control nodes currently not used by F-PDCCH can be accomplished by reading out portions of coded bits from the circular buffer counter-clockwise and mapping these bits to the modulation symbols available within FL control nodes assigned to the AT. Here, there is no repetition until all coded bits have been used.

With such a modulation strategy, unambiguous demodulation of the regular F-PDCH resources can be performed whenever supplementary F-PDCH resources are also present within the assignment. Furthermore, such modulation strategy can promote use of all coded bits produced by the encoder before any of coded bits is repeated Referring to FIG. 4, the starting points of the sub-packets (e.g., subpacket_0, subpacket_1) move in clockwise direction, which is also illustrated in FIG. 3. However, with respect to unused or extra resources (i.e., inactive F-PDCCH resources), the starting points of extra encoder bits can go in counter-clockwise direction. The starting points of extra encoder bits start from the last bit encoder output and progress in counter-clockwise direction.

As discussed, if the F-PDCACH decoding failure occurs at a particular AT, the AT may be required to decode all F-PDCCHs. The unused or extra encoded output bits, which are carried by inactive F-PDCCH resources, can be taken in reverse order starting from the last encoder bit position. For example, in the first instance of extra resources, the additional encoder bits are taken starting from the last encoder bit position.

The details of actual resource partitioning depends on the F-PDCCH design. Here, a portion of the resources are reserved for the F-PDCCHs. These resources can be referred to as control nodes.

Figure 5:
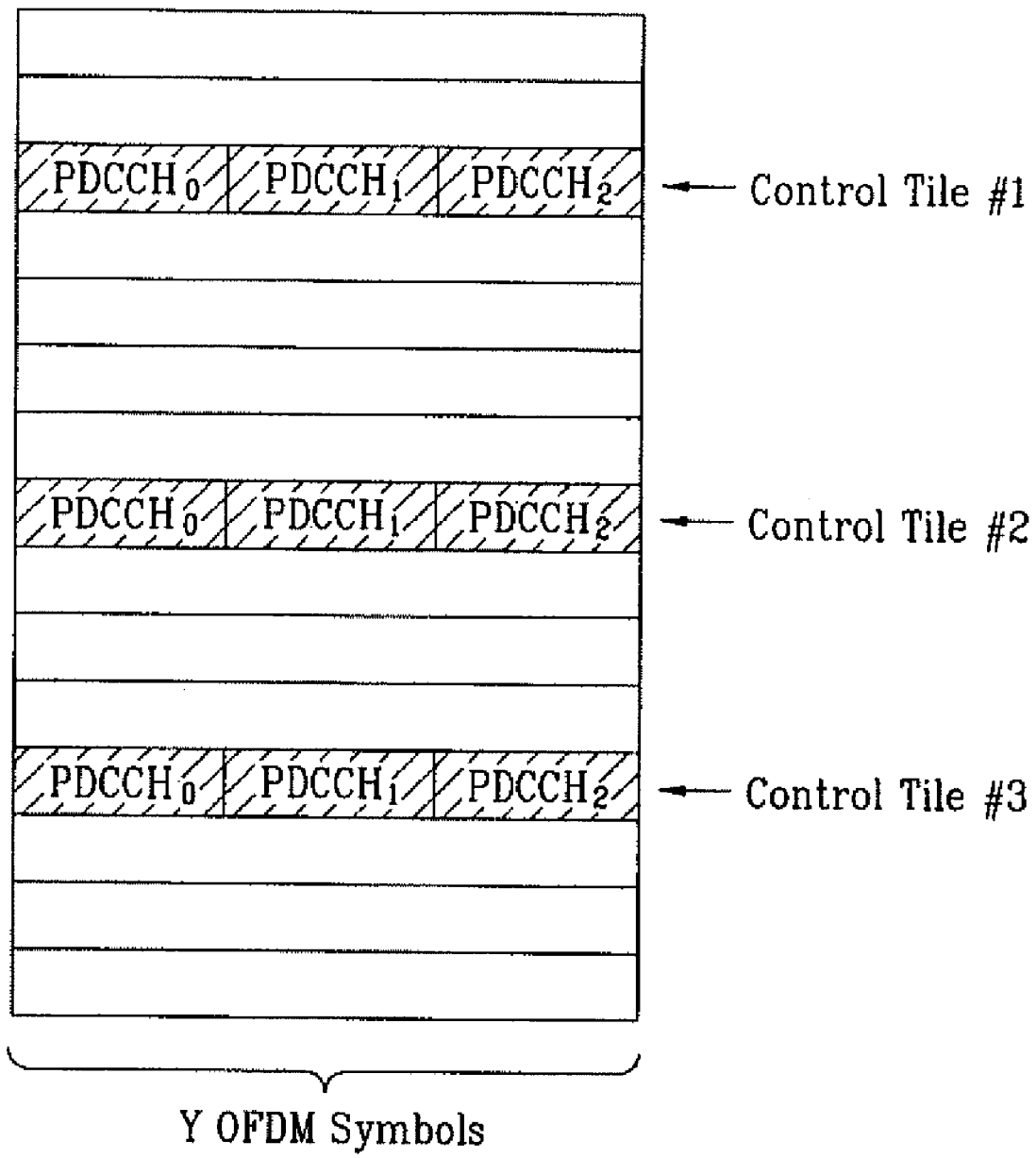
FIG. 5 is an exemplary diagram of resource partitioning in which all three (3) F-PDCCHs are active.

A control node can carry multiple F-PDCCHs. Alternatively, a F-PDCCH may occupy multiple control nodes. FIG. 5 is an exemplary diagram of resource partitioning in which all three (3) F-PDCCHs are active. Referring to FIG. 5, there are three (3) control nodes (or tiles) and three (3) F-PDCCHs, and these three (3) control nodes (or tiles) are reserved. Furthermore, all F-PDCCHs are active and are used only for control signaling. However, if a F-PDCCH is inactive, then that resource can be allocated to a F-PDCH.

Figure 6:
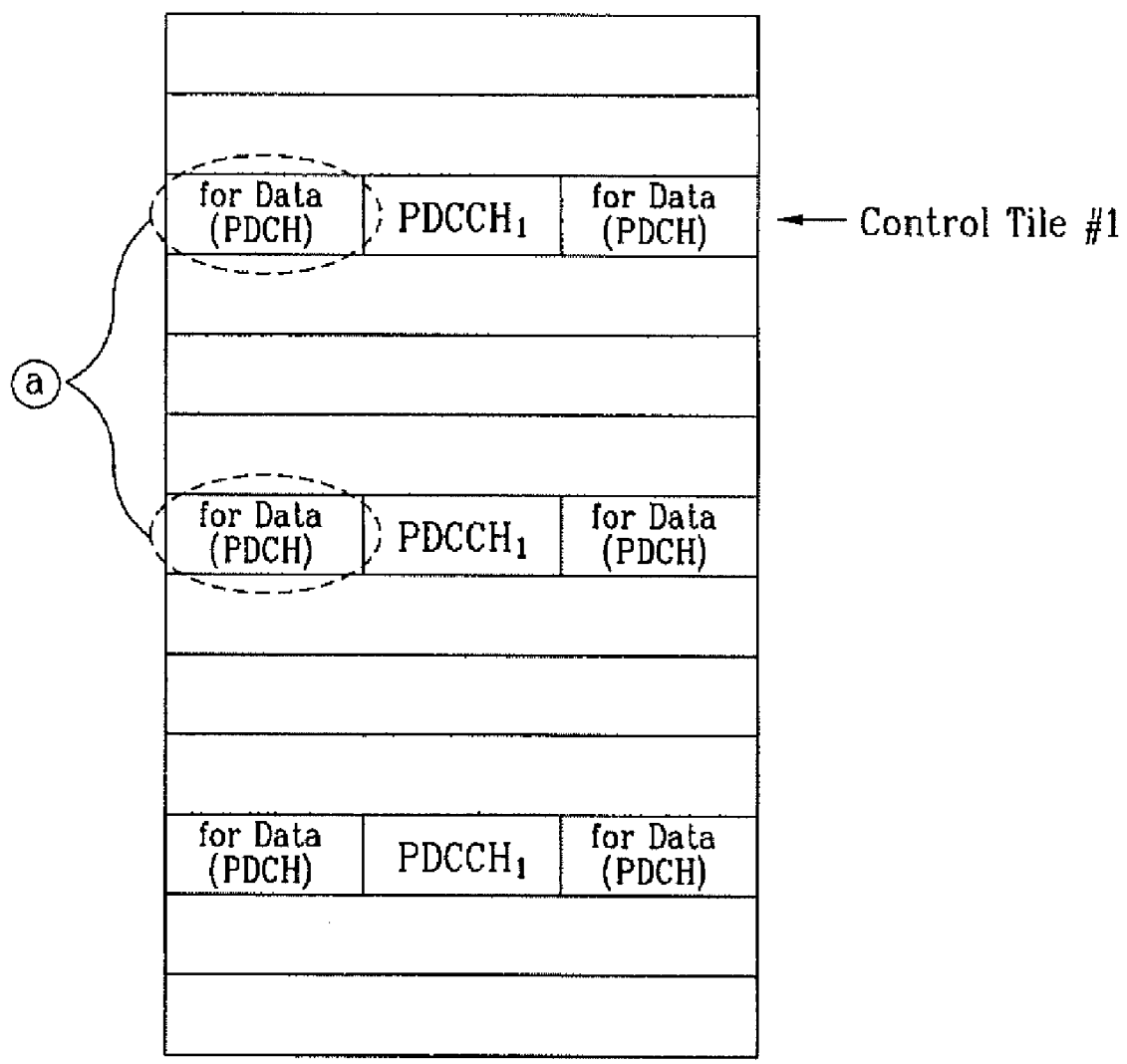
FIG. 6 is an exemplary diagram illustrating resource partitioning in which there are one (1) active F-PDCCH and two (2) inactive F-PDCCHs.

FIG. 6 is an exemplary diagram illustrating resource partitioning in which there are one (1) active F-PDCCH and two (2) inactive F-PDCCHs. Here, F-PDCCH_0 and F-PDCCH_1 are inactive. As such, the resources of F-PDCCH_0 and F-PDCCH_1 can now be allocated to the F-PDCH(s) to carry data.

Referring to FIG. 6, control node 1 can be allocated to a scheduled AT. In this case, the number of extra resources can range from 0 to 3 extra units of F-PDCCH resources depending on the number of inactive F-PDCCHs. Moreover, multiple control nodes can be allocated to an AT.

Alternatively, the F-PDCCH resource can be allocated to an AT. For example, the F-PDCCH_0 resources across the three control nodes can be allocated to an AT. For general cases, a subset of the unused F-PDCCHs can be allocated to the scheduled AT.

Figure 7:
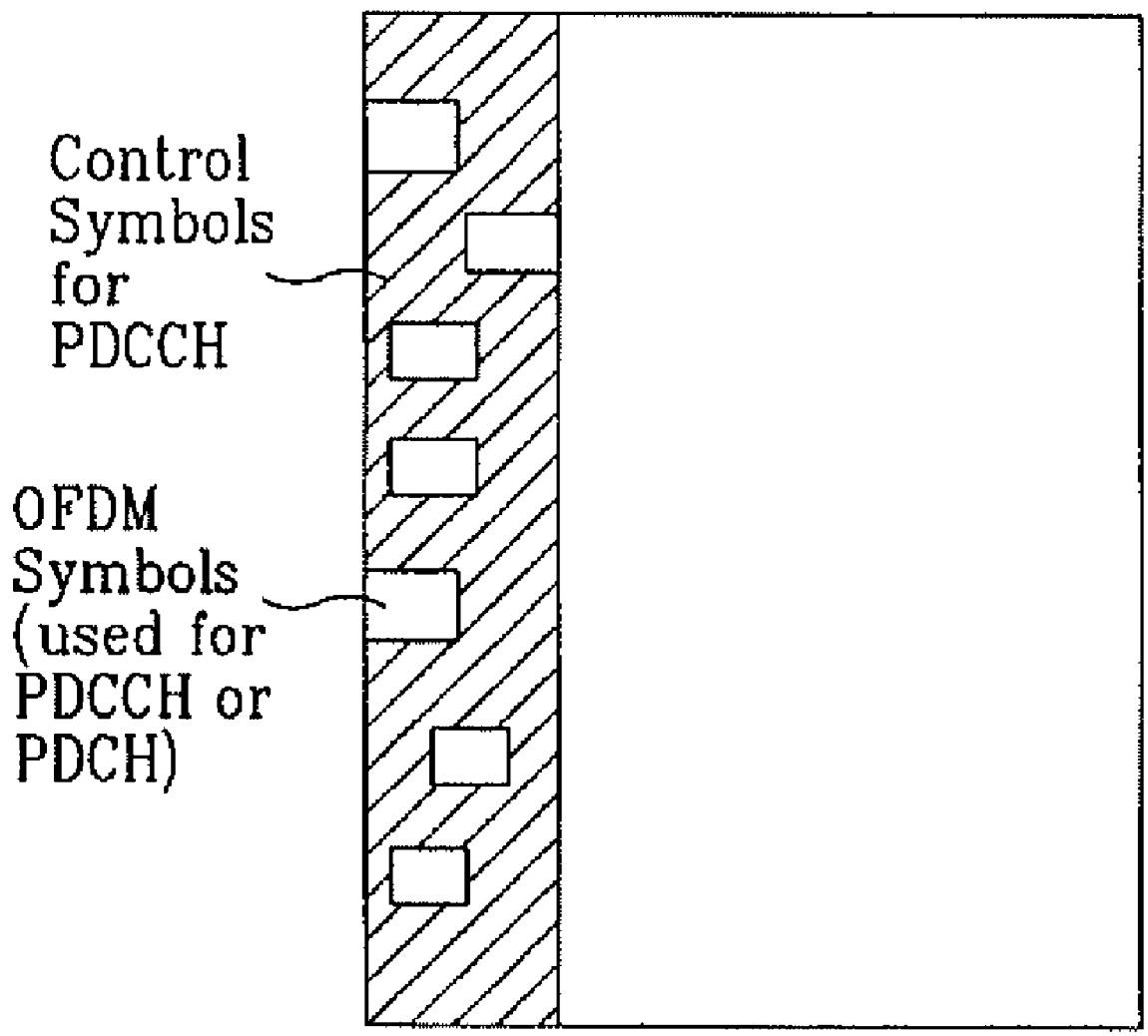
FIG. 7 is an exemplary diagram illustrating resource allocation with control symbols.

FIG. 7 is an exemplary diagram illustrating resource allocation with control symbols. Here, the reservation is with respect to time and across all or a subset of frequency sub-carriers. Referring to FIG. 7, the white boxes represent the resources reserved for a F-PDCCH. If the F-PDCCH is inactive, then these resources can be used by one or more F-PDCH(s) to carry data.

As discussed, the reserved F-PDCCH resources can be used. To this end, the AT can be informed that it is able to use these reserved F-PDCCH resource, especially, given that the AT can read the PDCACH.

In operation, the F-PDCCH can indicate that the scheduled AT can use the particular control node (e.g., horizontal node or tile of FIG. 6) or particular control symbols (e.g., vertical symbols from FIG. 7). Moreover, a subset of the F-PDCCH resource can be labeled as a "node" or as an extension of another node which can be indicated on the F-PDCCH when the AT is scheduled. For example, the subset can be for only the resources of F-PDCCH_0 across all three control nodes (or two control nodes) or the resources of F-PDCCH_0 and F-PDCCH_1 across all three (two or one) control nodes.

Any set of nodes associated with control resources can be assigned to an AT as a set of shared resources. Moreover, modulation symbols within shared resources assigned to the AT that corresponds to F-PDCCH segments unused in the current frame can be occupied with traffic (or data) modulation symbols.

Furthermore, a scheduled AT can be assigned to use extra or unused F-PDCCH resources. Here, a flag may be added on the F-PDCCH to indicate if the AT can use the extra F-PDCCH resources under the condition that the F-PDCCH is inactive. Otherwise scheduled AT cannot use the extra F-PDCCH resources.

In addition, a data node can be associated with or tied to some subset of the F-PDCCH resources. This way, when an AT is allocated to or scheduled on this particular data node, the AT knows that it can then use that subset of F-PDCCH resources if available.

For example, referring to FIG. 6, if the top-most row (node) is tied to control node 1 and if an AT is scheduled to use the top most row, then it can use the resources available on control node 1, if available. Moreover, if the top-most row (node) is tied to a subset of resources defined by control node 1, control node 2, and F-PDCCH_0 and if an AT is scheduled to use the top-most row, then it can use the resources available in this sub-set (indicated as ⓐ in FIG. 6).

In addition, if a bottom row is tied to a subset of resources defined by Control node 3 and F-PDCCH_1, and F-PDCCH_3, and if an AT is scheduled on this row, then it can use the resources available in this sub-set, if available.

With F-PDCACH, greater sector throughput can be achieved via more efficient forward link (FL) resources utilization. As discussed, F-PDCCH inactivity (e.g., "OFF") can yield unused resources which can be re-allocated to carry data over the F-PDCH. As a result, adaptive partitioning of F-PDCH and F-PDCCH resources can be gained. For example, if no F-PDCCHs are needed in a frame, then all the tone resources earmarked for the F-PDCCHs can be used by F-PDCH.

In addition, with F-PDCACH, the F-PDCCH processing requirements at the ATs able to decode PDCACH can be minimized. That is, these ATs can know how many F-PDCCHs to process and need only read as many as defined by the F-PDCACH.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting user data via a control channel in a wireless communication system, the method comprising:
   transmitting a message including information on which control channel resources are used or unused; and
   transmitting user data via the unused control channel which is allocated to at least one user based on the message,
   wherein the user data is an added portion related to at least one sub-packet to be transmitted on a data channel.

2. The method of claim 1, wherein the control channel is any one of a packet data control channel (PDCCH), a shared signaling channel (SSCH), or a shared control channel (SCCH).

3. The method of claim 1, wherein the message is a packet data control assignment message (PDCAM) or a packet data control assignment channel (PDCACH).

4. The method of claim 1, wherein the message carries control channel information in a bitmap format in every frame.

5. The method of claim 4, wherein the bitmap is represented by variable lengths which correspond to a maximum number of unused control channels.

6. The method of claim 4, wherein the bitmap is divided into a specified number of sub-bitmaps, each sub-bitmap carries a control channel information type.

7. The method of claim 4, wherein the bitmap for the message is transmitted together with a bitmap for a voice user.

8. The method of claim 1, wherein the message is transmitted at a power level sufficient to reach access terminals allowed to use unused control channel resources.

9. The method of claim 1, wherein the message is transmitted via a resource reserved for the control channel resources.

10. The method of claim 1, wherein the message is categorized by different types where a first type uses a higher order modulation coding scheme (MCS) while a second type uses a lower order (MCS).

11. The method of claim 1, wherein the message is transmitted by any one of a default configuration which uses quadrature phase shift keying (QPSK) scheme or a higher modulation coding scheme (MCS) configuration which uses the QPSK or 16 quadrature amplitude modulation (QAM) scheme.

12. The method of claim 1, further comprising transmitting restricted control channel resources to access terminals having relatively better channel conditions than to access terminals with relatively worse channel conditions.

13. The method of claim 1, wherein the message is transmitted in a bitmap format via a separate physical channel or via one of the control channels.

14. The method of claim 1, wherein the user data is any one of parity bits, information bits, systematic bits, or coded bits.

15. The method of claim 1, wherein the message is transmitted in a bitmap format which is based on orthogonality.

16. The method of claim 1, wherein the user data is transmitted via the unused control channel in form of sub-packets, the sub-packets have fixed starting positions.

17. The method of claim 1, wherein each SCCH is pre-allocated for use by a specific user.

18. The method of claim 1, wherein the user data is used to decode the at least one sub-packet.

19. The method of claim 1, wherein the user data contains same information as the sub-packet.

20. The method of claim 1, wherein the user data is transmitted via the unused SCCH in form of sub-packets, the sub-packets have fixed starting positions.

* * * * *